(12) United States Patent
Hinds et al.

(10) Patent No.: US 6,181,978 B1
(45) Date of Patent: Jan. 30, 2001

(54) SYSTEM AND METHOD FOR GENERATING A SMOOTH BLENDING FILLET SURFACE

(75) Inventors: John Knox Hinds, Glenville; Garth M Nelson; David Alan Caruso, both of Ballston Lake, all of NY (US)

(73) Assignee: General Electric Company, Schenectady, NY (US)

( * ) Notice: Under 35 U.S.C. 154(b), the term of this patent shall be extended for 0 days.

(21) Appl. No.: 09/127,247

(22) Filed: Jul. 31, 1998

(51) Int. Cl.$^7$ ..................................................... G06F 17/50
(52) U.S. Cl. ................................................. 700/182; 700/98
(58) Field of Search ........................................ 700/98, 182

(56) References Cited

U.S. PATENT DOCUMENTS 5,345,546  9/1994  Haranda et al. .
5,774,359  6/1998  Taneja .
5,793,373 * 8/1998  Sekine et al. ........................ 345/420

* cited by examiner

Primary Examiner—Thomas M. Heckler
(74) Attorney, Agent, or Firm—David C. Goldman; Jill M. Breedlove

(57) ABSTRACT

A system and method for generating a smooth blending fillet surface between a platform and an airfoil shape mounted thereto. This is accomplished by generating a fillet surface by acquiring descriptions of an airfoil shape (e.g., the pressure side, the leading edge, the suction side and the trailing edge), a platform surface, a platform footprint, and filleting curves for the pressure and suction sides of the airfoil. These descriptions are used produce a smooth mesh of points which capture both the blending fillet surface and the airfoil. The smooth mesh of points are used to render slope-continuous blended fillet surfaces.

28 Claims, 19 Drawing Sheets

SYSTEM AND METHOD FOR GENERATING A SMOOTH BLENDING FILLET SURFACE

BACKGROUND OF THE INVENTION

This invention relates generally to blending an airfoil surface to a platform surface and more particularly to generating a smooth blending fillet surface between an airfoil shape and a restricted platform surface upon which the airfoil is mounted.

Typically, a turbine blade designer uses a computer-aided design (CAD) system or a computer-aided manufacture (CAM) system to generate a fillet surface for blending an airfoil surface to a platform surface. The process of creating a fillet blend on a CAD system requires identifying the adjacent non-tangent faces of a computational solid model of a bucket blade, then executing a system function that adds a tangent blend between the adjacent faces. The subject faces are that of the vane surface at its root (or base) and the dovetail platform to which it is attached.

One problem with using either the CAD system or the CAM system to generate the fillet surface for blending the airfoil surface to the platform is that the solution provided by these systems typically assumes a single fixed radius blend and an unrestricted platform size. Assuming a single fixed radius blend and an unrestricted platform size results in a fillet surface that is undesirable. In the application of long bucket blades it is undesirable to have a fillet blend of constant (single fixed) radius. Compound (multiple radii) blends are required in order to separate centrifugal and tangential vane stresses at the root. Also, assuming an unrestricted platform size results in a fillet surface that is truncated and disrupts smooth steam flow at the root of the steam path. Since the fillet surface is undesirable, a skilled artisan has to usually finish the surface to meet the design requirements. Associated with adding a compound (multiple radii) blend is the preparation of the vane surface. The vane surface must be largely free of inflections, voids and reversing curvatures that will interfere or perhaps prevent the computation of a tool path by subsequent CAM software. CAD systems require a labor intensive process of analysis and editing, to identify and remedy the aforementioned surface anomalies. Therefore, there is a need for a system and method that can generate a fillet surface for blending the airfoil surface to a restricted platform with multiple varying radii.

BRIEF SUMMARY OF THE INVENTION

This invention is able to generate a fillet surface for blending the airfoil surface to a restricted platform with multiple varying radii by acquiring descriptions of an airfoil shape (e.g., the pressure side, the leading edge, the suction side and the trailing edge), a platform surface, a platform footprint, and filleting curves for the pressure and suction sides of the airfoil. The invention uses these descriptions to produce a smooth mesh of points which capture both the blending fillet surface and the airfoil. The invention uses the smooth mesh of points to render slope-continuous blended fillet surfaces. A CAD system or a CAM system receives the slope-continuous blended fillet surfaces in digital form. A manufacturing process such as a numerically controlled (NC) machining operation then machines the blended fillet surfaces according to the digital expression provided by the CAD or CAM system.

In accordance with this invention, there is provided a system, a method and an article of manufacture for generating a blending fillet surface between a platform and an airfoil mounted thereto. In this invention, a memory stores a user-specified airfoil shape for the airfoil comprising a plurality of section curves substantially parallel to each other and each having a leading edge, a trailing edge, a pressure side, and a suction side, a platform surface, and a platform footprint for the platform. A processor coupled to the memory, generates the blending fillet surface. The processor comprises means for extracting the plurality of section curves, the platform surface, and the platform footprint from the memory. A generating means generates a plurality of vertically oriented curves crossing through each of the plurality section curves. A specifying means specifies a first multi-segment fillet profile curve for blending the pressure sides of the plurality of section curves to the platform and a second multi-segment fillet profile curve for blending the suction sides of the plurality of section curves to the platform. A determining means determines a position for placing both the first and the second multi-segment fillet profile curves about each of the plurality of vertically oriented curves. A placing means places the first and the second multi-segment fillet profile curves about the pressure sides and the suction sides of each of the plurality of section curves. A generating means generates a plurality of blending curves about the leading edges and the trailing edges of each of the plurality of section curves. A rendering means renders the blending fillet surface from the first and the second multi-segment fillet profile curves and the plurality of blending curves.

BRIEF DESCRIPTION OF THE DRAWINGS

FIG. 18 shows a schematic of a general-purpose computer system shown in FIG. 1 in which a part of the system for generating a smooth blending fillet surface operates on.

DETAILED DESCRIPTION OF THE INVENTION

Figure 1:
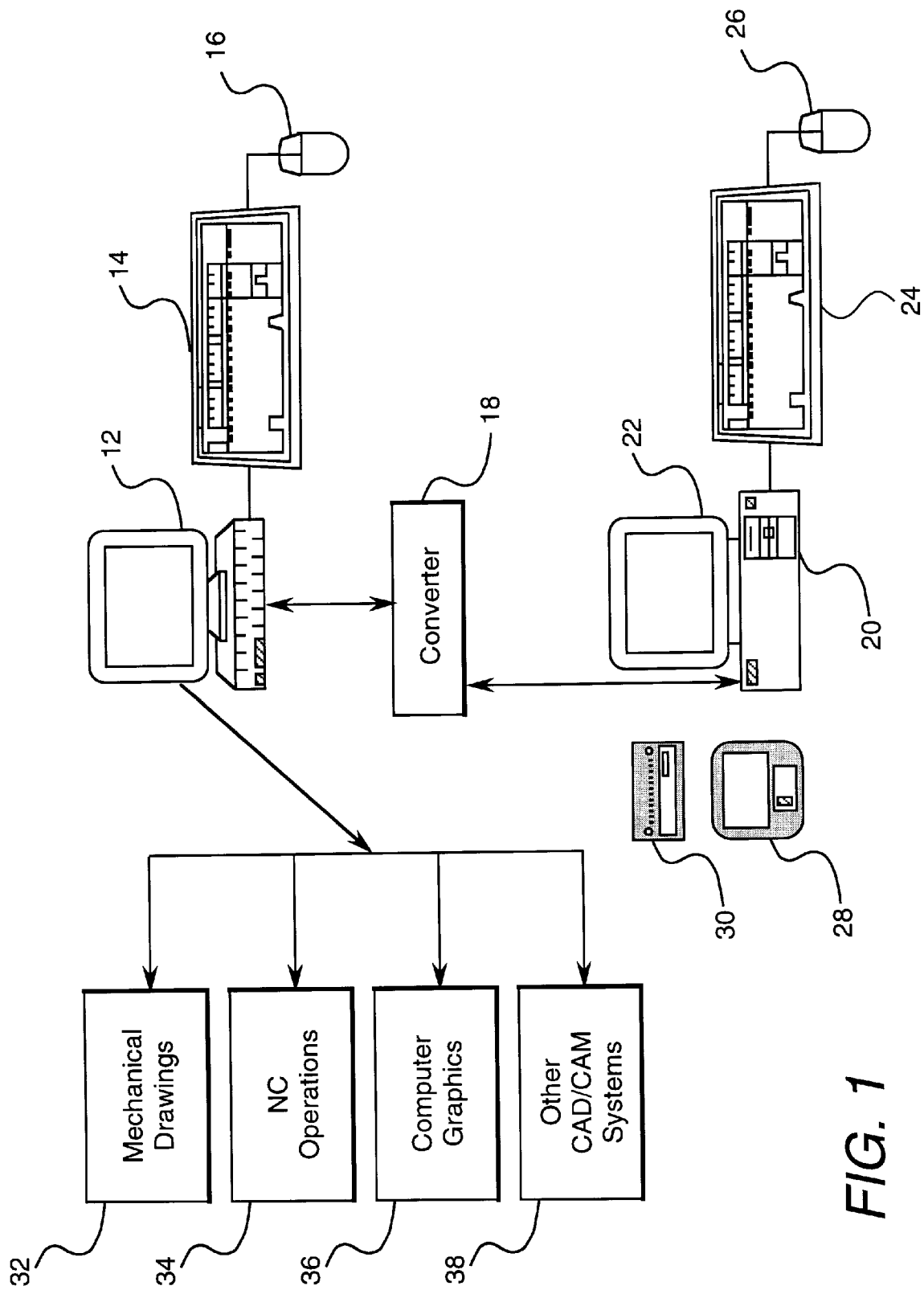
FIG. 1 shows a block diagram of a system for generating a smooth blending fillet surface according to this invention.

FIG. 1 shows a block diagram of a system 10 for generating a smooth blending fillet surface according to this invention. A turbine blade designer uses a computer workstation 12 such as a CAD or CAM system to specify an airfoil shape and a platform via input devices such as a keyboard 14 and a mouse device 16. The CAD or CAM system 12 may be a commercially available type such as an Unigraphics CAD/CAM system or a NuForm CAD/CAM system. The airfoil shape comprises a plurality of section curves that are substantially parallel to each other, with each having a leading edge, a trailing edge, a pressure side, and a suction side. The platform shape comprises a platform surface, a platform border and a platform footprint. The curves for the airfoil shape and the platform shape are in a commercially available format such as IGES (Interim Graphics Exchange Standard). A converter 18 converts the curves for the airfoil shape and the platform shape from an IGES format into a format compatible with a computer 20 such as a personal computer or a workstation.

The computer 20 generates a smooth blending fillet surface from the specified curves. The computer 20 comprises a processor and a memory including random access memory (RAM), read only memory (ROM) and/or other components. Attached to the computer 20 are a monitor 22, a keyboard 24, and a mouse device 26. The computer 20 operates under control of an operating system stored in the memory to present data such as the specified curves to the designer on the display of the monitor 22 and to accept and process commands from the designer via the keyboard 24 and the mouse device 26. The computer 20 generates the smooth blending fillet surface using one or more computer programs or applications through a graphical user interface. A computer-readable medium e.g., one or more removable data storage devices 28 such as a floppy disc drive or a fixed data storage device 30 such as a hard drive, a CD-ROM drive, or a tape drive tangibly embody the operating system and the computer programs implementing this invention. The computer programs are programmed in FORTRAN, but other languages such C or C++ may be used.

After generating the smooth blending fillet surface, the computer 20 outputs the surface to the converter 18 which converts the surface into an IGES format that is compatible with the CAD or CAM system 12. The CAD or CAM system 12 uses the smooth blending fillet surface to generate mechanical drawings 32, numerical control (NC) data 34 for a machining operation, computer graphics 36, or to send to other CAD/CAM systems 38. Those skilled in the art will recognize that the system illustrated in FIG. 1 is not intended to limit this invention. In particular, those skilled in the art will recognize that other alternative hardware environments may be used without departing from the scope of this invention. For example, the computer program for generating the smooth blending fillet surface may be implemented directly in the CAD or CAM system 12, which obviates the need for the converter 18 and the computer 20 and its peripherals.

Figure 2:
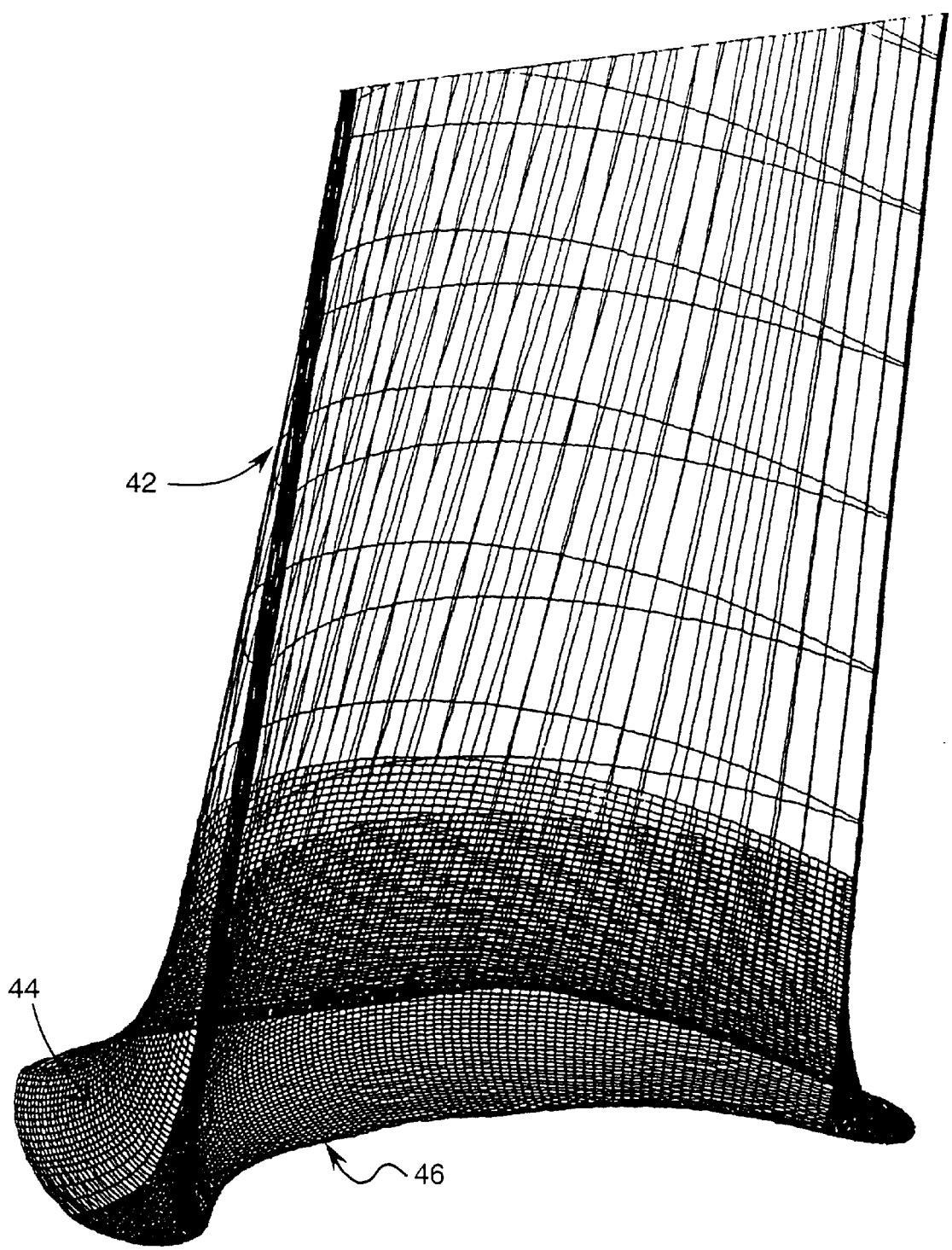
FIG. 2 shows a three-dimensional wire frame drawing of a turbine blade generated according to this invention.

Generally, a turbine blade comprises a platform having a substantially flat, circular face from which a centrally positioned airfoil extends. The surfaces of the platform and the airfoil merge in a region which is the fillet, or transition region of the blade. During normal operation of the blade, the greatest bending stresses occur at the fillet. An objective of this invention is to set forth a method for generating a smooth blend fillet that can achieve a greater holding strength for withstanding the stresses that occur at the fillet. FIG. 2 shows a three-dimensional wire frame drawing of a turbine blade 40 generated according to this invention. The turbine blade 40 comprises an airfoil 42, a fillet blend 44 and a platform 46.

Figure 3:
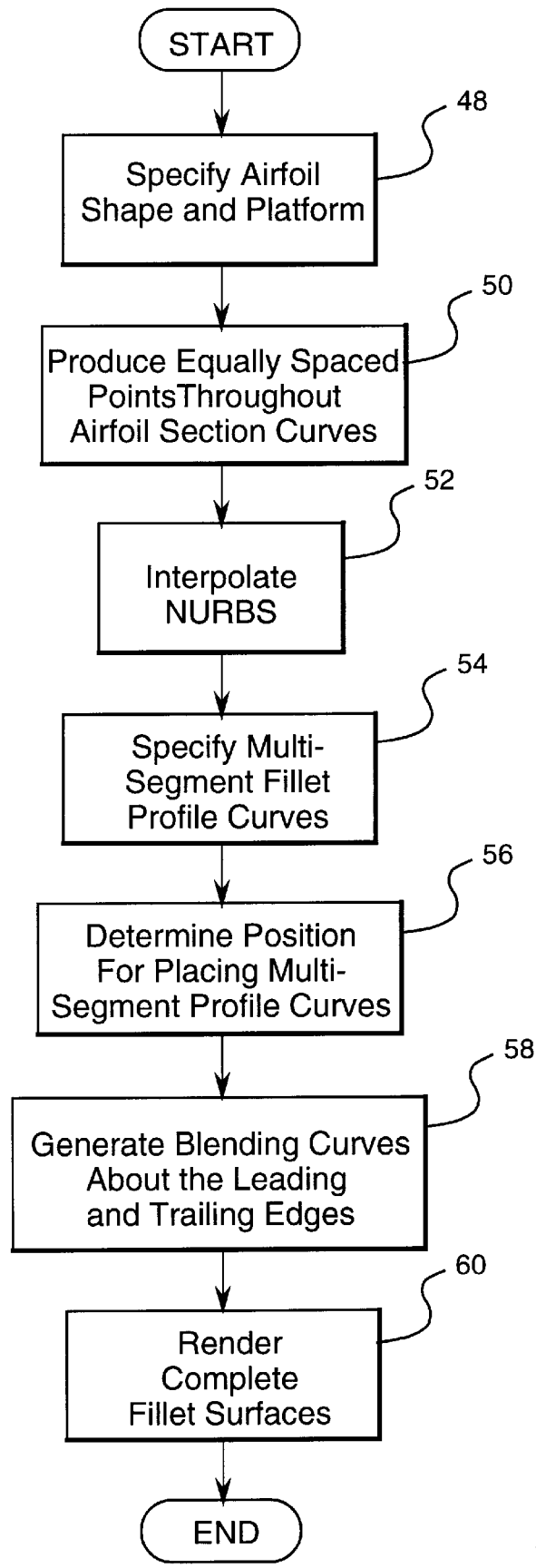
FIG. 3 shows a flow chart setting forth the steps for generating a smooth blend fillet according to this invention.
Figure 4:
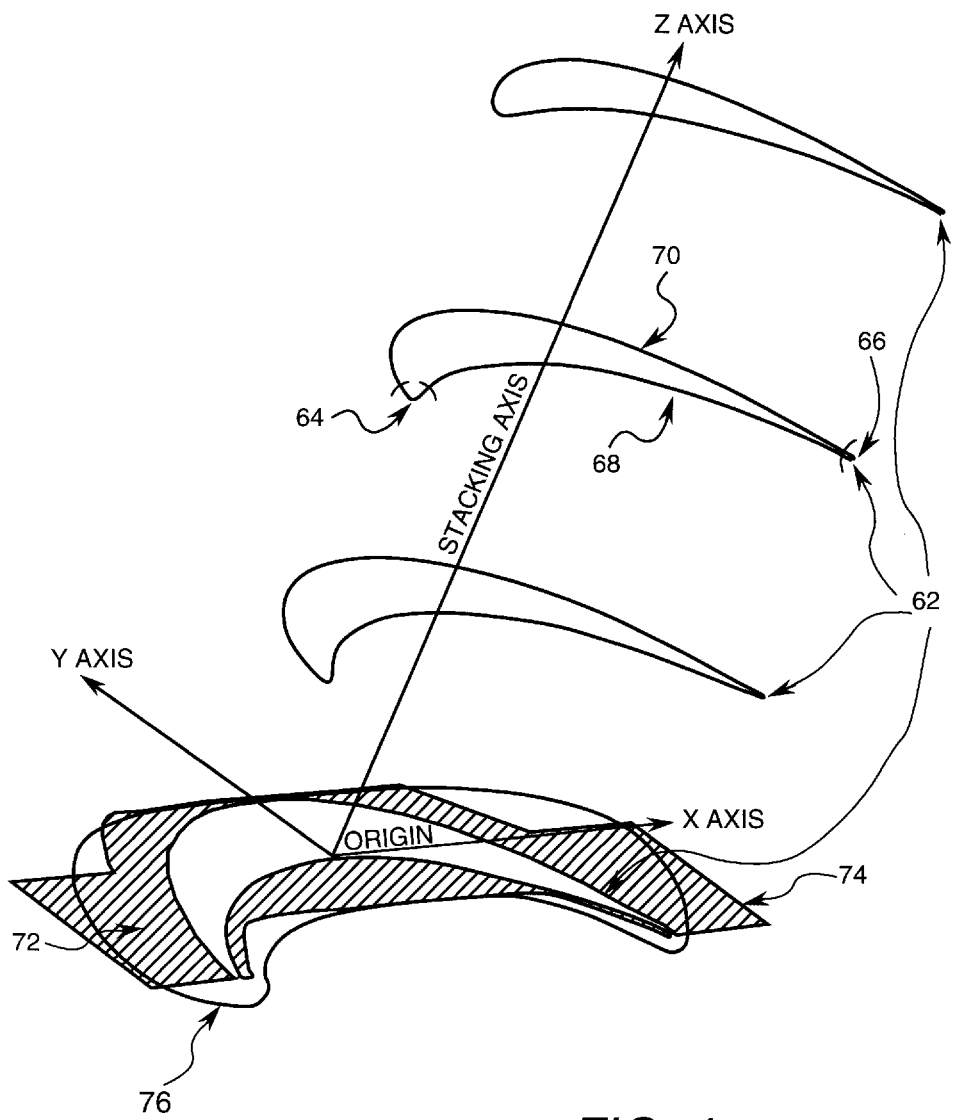
FIG. 4 shows a drawing of a specified airfoil shape and a platform generated according to this invention.
Figure 4:
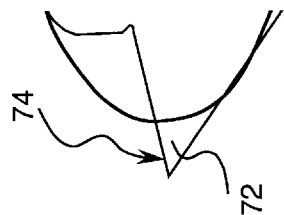

Historically, it has been very difficult to achieve a usable and adequate definition of the blended area (i.e., the fillet) between the platform 46 and the airfoil 42, especially around the leading and trailing edges of the blade. FIG. 3 shows a flow chart setting forth the steps for generating a smooth blend fillet according to this invention for use with a turbine blade. At 48, the turbine blade designer specifies an airfoil shape and a platform. This invention assumes that the airfoil is oriented with its stacking axis in a vertical z-direction and that it rests upon a dovetail platform which is at the low z-side of the airfoil, possibly at or near an xy-plane at z=0. In addition, this invention assumes that a set of discrete airfoil curve sections are specified in some form and lie in surfaces which placed along and perpendicular to the stacking axis of the airfoil. FIG. 4 shows a drawing of a specified airfoil shape and a platform generated according to this invention. The airfoil shape comprises a plurality of section curves 62 that are substantially parallel to each other, with each having a leading edge 64, a trailing edge 66, a pressure side 68, and a suction side 70.

The platform shape comprises a platform surface 72, a platform border (i.e., the boundary limits on the platform surface) 74 and a platform footprint 76. In the illustrative embodiment, the platform surface 72 is planar, however, the methodology of this invention applies to non-planar platform surfaces as well. The platform footprint 76 is the curve around the platform surface 72 which constrains the fillet blend. The platform footprint 76 may be modified from the actual platform border 74 in order to provide a smooth target for the fillet blend surface. The platform footprint 76 may be restrained with the physical limits of the platform, or extended beyond them. Other characteristics of the platform footprint 76 are that it should maintain a convex target so that the fillet surface does not undulate, it should maintain uniformity and strength in the fillet, and provide extra material at the leading and trailing edges for strength.

Figure 5:
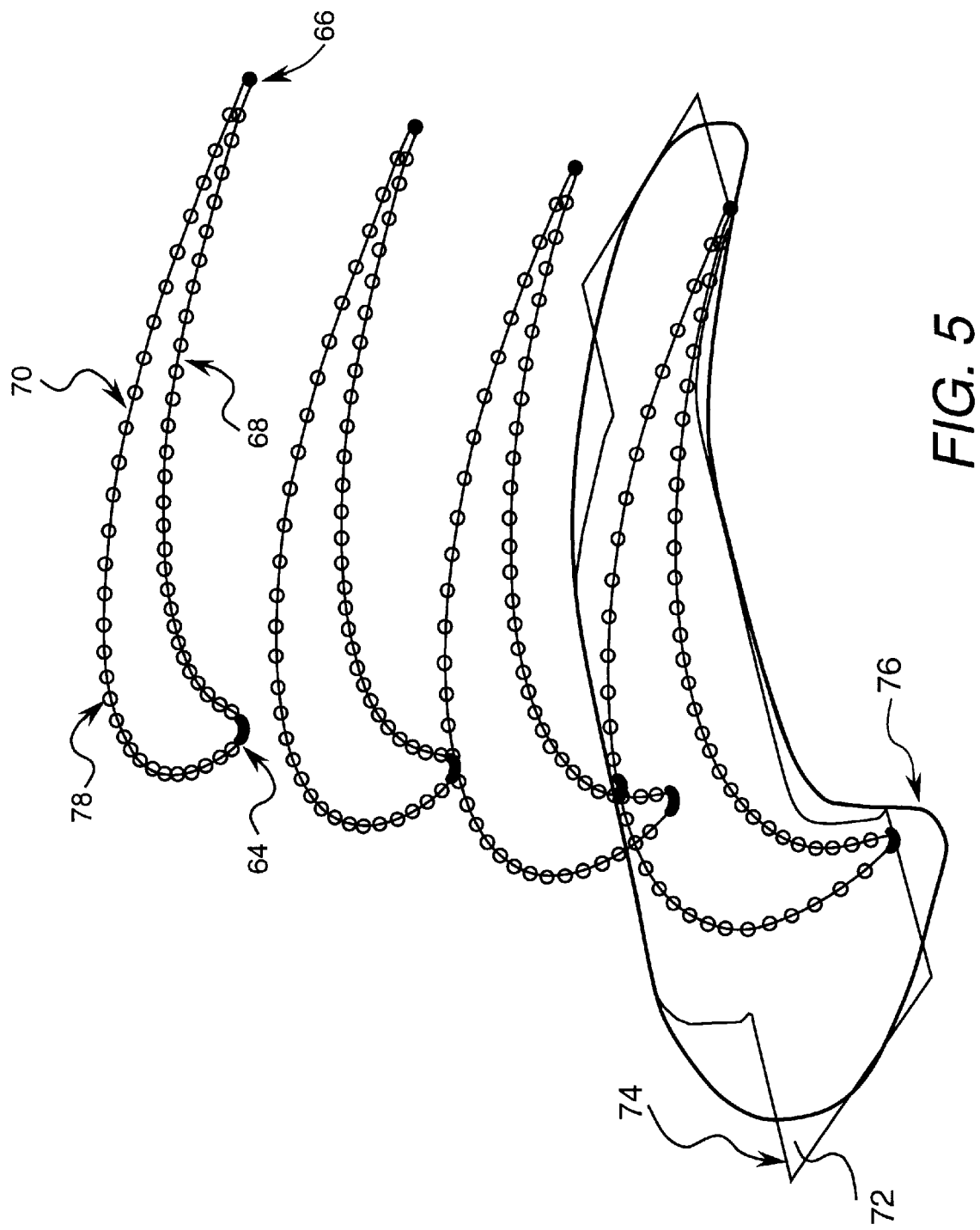
FIG. 5 shows a drawing of airfoil section curves specified in FIG. 4 with equally spaced points produced throughout according to this invention.
Figure 6:
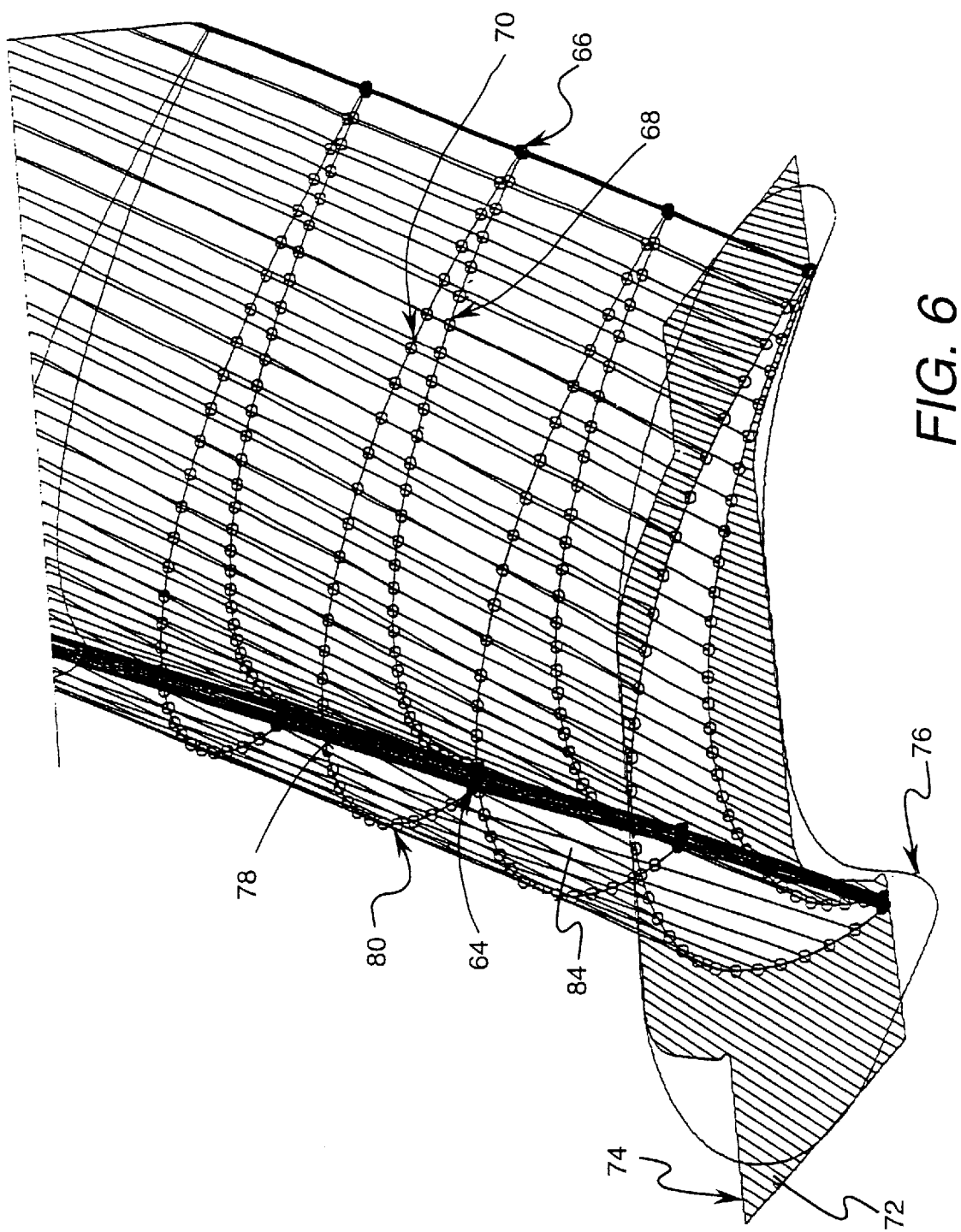
FIG. 6 shows a three-dimensional wire frame drawing of the airfoil section curves with Non Uniform Rational Bspline Surfaces (NURBS) interpolated through the meshes of points shown in FIG. 5 according to this invention.

Referring back to FIG. 3, after specifying the airfoil shape and the platform, the designer produces a plurality of equally spaced points at 50 throughout each of the plurality of section curves. FIG. 5 shows a drawing of the airfoil section curves with equally spaced points 78 throughout its regions (i.e., the leading edge, the trailing edge, the pressure side, and the suction side). Referring to FIG. 3, after producing the equally spaced points, the designer interpolates Non Uniform Rational Bspline Surfaces (NURBS) through the meshes of points at 52. FIG. 6 shows a three-dimensional wire frame drawing of the airfoil section curves with the interpolated NURBS 80. These surfaces yield the continuum of curves parallel to the direction of the original airfoil sections and another set of vertically oriented curves 84 crossing the airfoil sections at approximately right angles.

Figure 7:
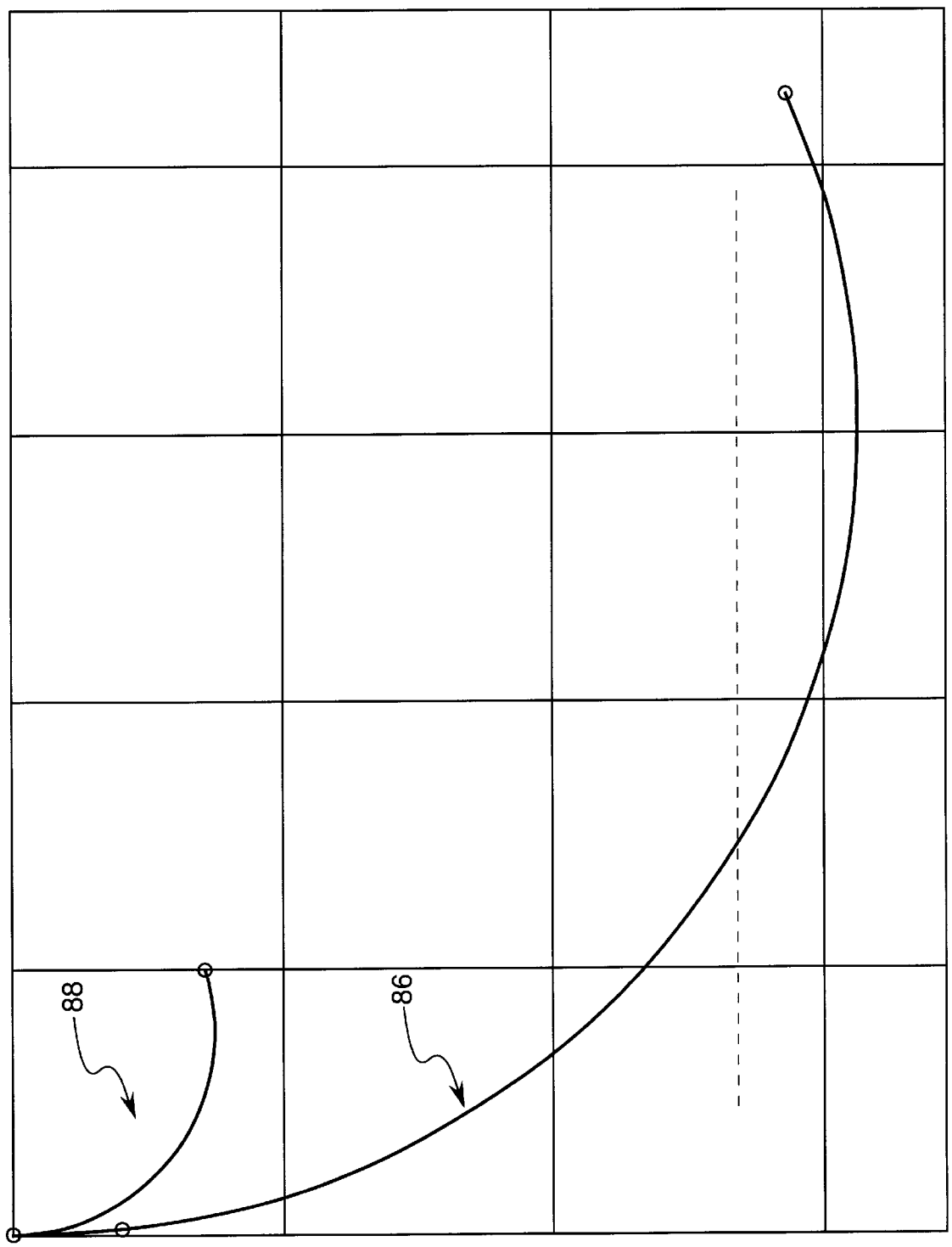
FIG. 7 shows multi-segment fillet profile curves according to this invention.

Referring back to FIG. 3, after generating a plurality of vertically oriented curves, then the designer specifies multi-segment fillet profile curves at 54. In particular, the designer specifies a first multi-segment fillet profile curve for blending the pressure side of the airfoil with the platform and a second multi-segment fillet profile curve for blending the suction side of the airfoil to the platform. In the simplest case, the profile curves are circular arcs, which are equivalent to a fixed-radius fillet blend, however, the curves can be parabolic or composed of many tangentially continuous segments. In a general case, continuously varying sections may be specified as well, which corresponds to a variable fillet. For either the simple case or the general case, all that is required is a method of defining the desired section profile at each of the vertically oriented curves on the airfoil. Examples of the multi-segmented curves used for the simple case are shown in FIG. 7. The larger multi-segmented fillet profile curve 86 is for the suction side and is composed of two circular arcs, one with a radius of 4.625 units extending for an arc span of 5 degrees, the second with a radius of 3 units extending for 110 degrees span. The smaller multi-segment profile curve 88 is for the pressure side and has a radius of 0.75 units for an angular span of 110 degrees.

Figure 8:
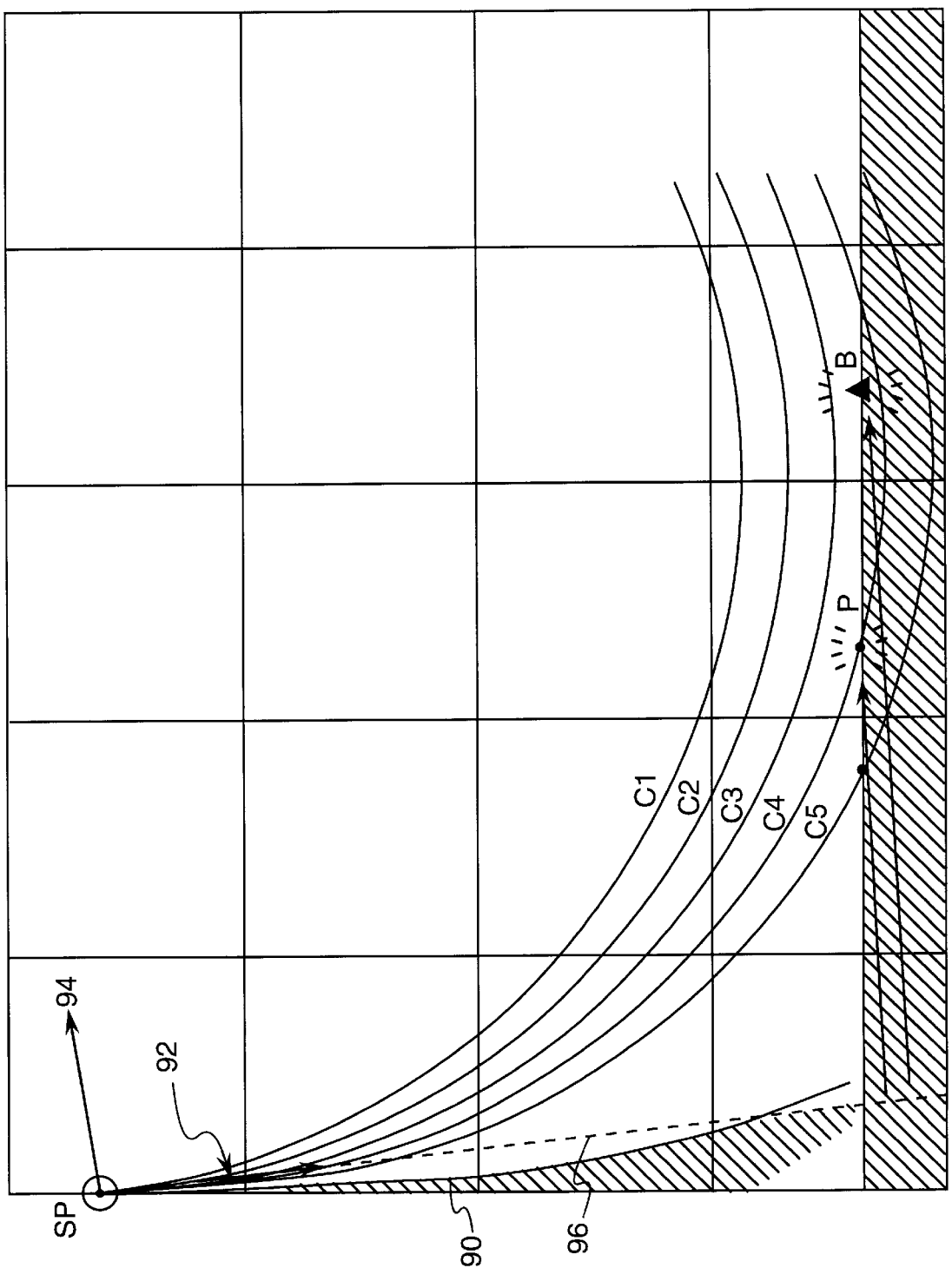
FIG. 8 shows a drawing of how a position is determined along one vertical curve from an airfoil according to this invention.

Referring back to FIG. 3, the next step is determining a position for the appropriate fillet profile curve at each vertical curve on the airfoil at 56. FIG. 8 shows a side view of how the position is done along one vertical curve 90 from an airfoil. First, the designer selects a point, SP, at a specified height along the vertical curve. At this point, the curve has a downward pointing tangent vector 92. The point SP also belongs to the airfoil surface and therefore, has an associated outward pointing surface normal vector 94. The point SP and the two vectors define a unique plane in which the fillet profile curve can be positioned. The planar view in FIG. 8 is within the plane defined by these two vectors. Once positioned, a computation is made to determine the first intersection point between the positioned fillet profile curve and the platform surface. Several consecutive descending positions of the fillet profile curve are shown in FIG. 8. Curves C1, C2 and C3 do not intersect the platform, while curves C4 and C5 do intersect the platform. The first descending curve, in this case is C4, which has an intersection at the labeled point "P", is the desired curve. It is helpful if the stepping is performed at a very small interval, so that this first intersection is usually nearly tangent to the platform surface where it intersects it. However, if the starting height for the search is too low, or there is not sufficient space within the platform footprint, then the profile curve may not intersect the platform surface at a tangential condition. Thus, the designer has to judge the acceptability of this condition.

Next, a determination is made to determine whether the first intersection point is contained within the platform footprint for the defined plane. In particular, the first intersection point, P, needs to lie within the limits of the profile footprint curve in this plane. Basically, the relevant plane for the computation is used to intersect the dovetail footprint curve. The correct point of intersection is the point of intersection with the least positive distance from a tangent line 96 to the vertical airfoil curve 90. The positive side of the tangent line 96 is determined by the outward pointing surface normal vector 94 to the airfoil. The fillet profile intersection point "P" is then compared to the platform intersection point "B" in order to ensure containment. Containment is determined by comparing distances of these two points from the tangent line 96 which positioned this multi-segment fillet profile curve. In the example shown in FIG. 8, the point "P" where curve "C4" intersects the platform surface is closer than the border point "B". Therefore, the point "P" and its multi-segment fillet profile curve "C4" is the solution to the filleting problem along one vertical airfoil curve. If it is not contained, the downward search for a correct position of the profile curve is continued until an intersection with the platform does lie within the platform footprint.

Figure 9:
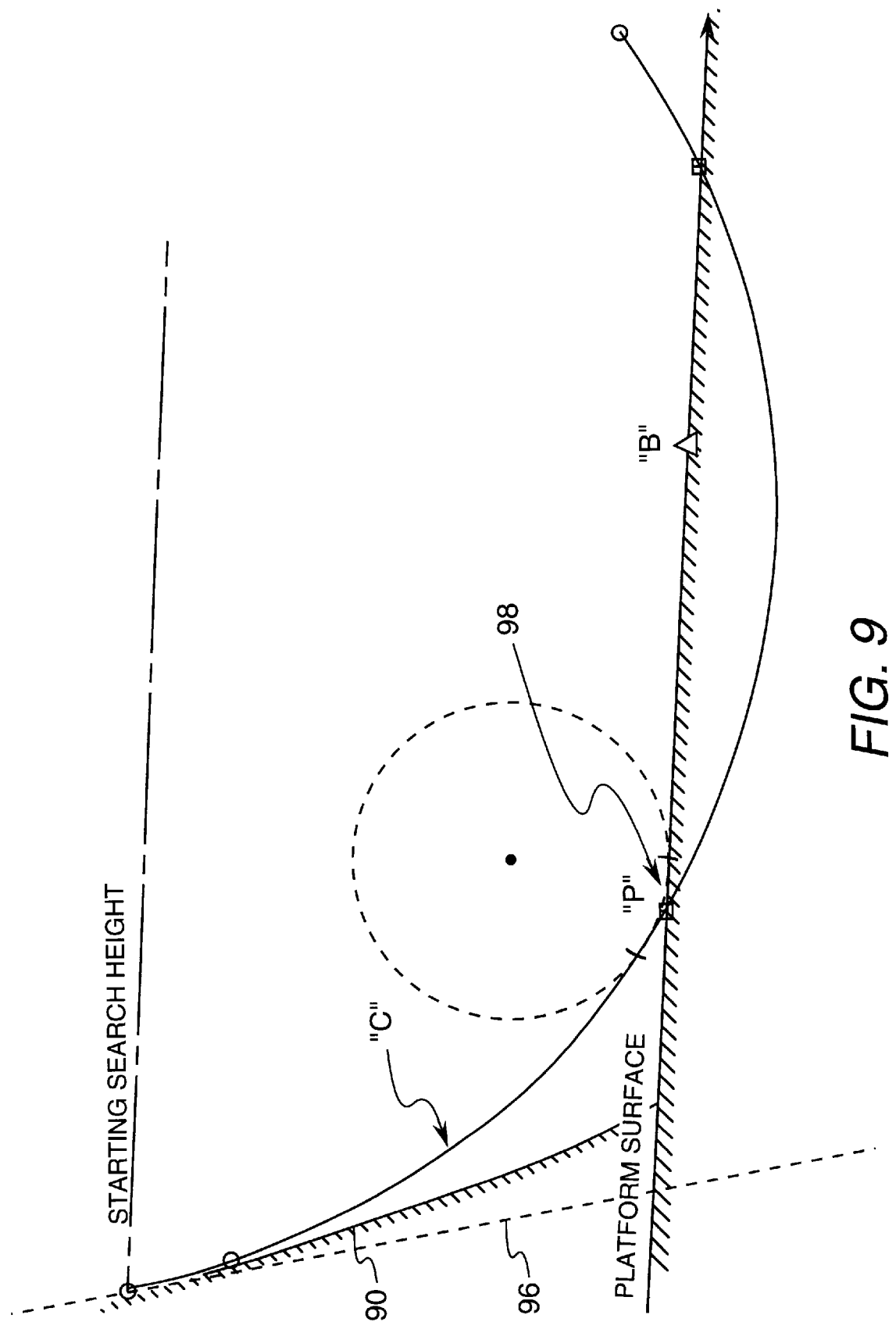
FIG. 9 shows a final filleting calculation is determined according to this invention.

After determining whether the first intersection point is contained within the platform footprint for the defined plane, the invention performs a final filleting calculation as shown in FIG. 9. In particular, if there is some distance between the intersection point "P" and the platform border point "B", then a smaller fixed radius fillet curve 98 tangent to the profile curve "C" and to the platform surface in this plane is computed and integrated with the multi-segment fillet profile curve "C". This final operation may allow tangency in the final multi-segment fillet profile curve to occur when the limited search height prevented the profile curve "C" from being positioned in tangency to the platform surface. If no space is available between the intersection point "P" and the platform border point "B", then the multi segment fillet profile curve is accepted as it is. After the multi segment fillet profile curve is accepted and trimmed, it is saved, together with the vertical airfoil curve which was used to position it.

Figure 10:
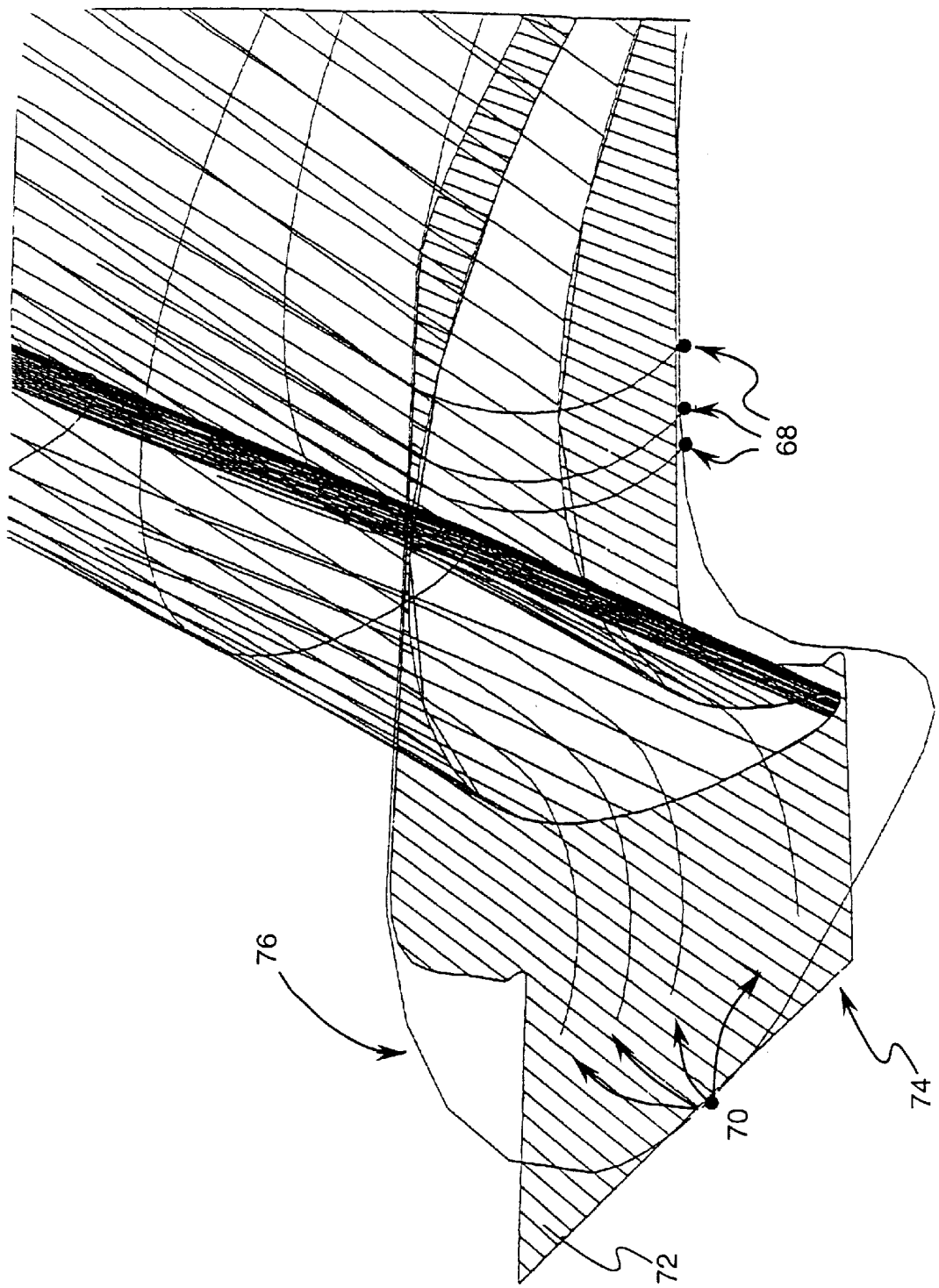
FIG. 10 shows a three-dimensional wire frame drawing showing results of determining the final filleting calculation at a few positions on the pressure and suction sides of one of the airfoil section curves in the airfoil according to this invention.
Figure 11:
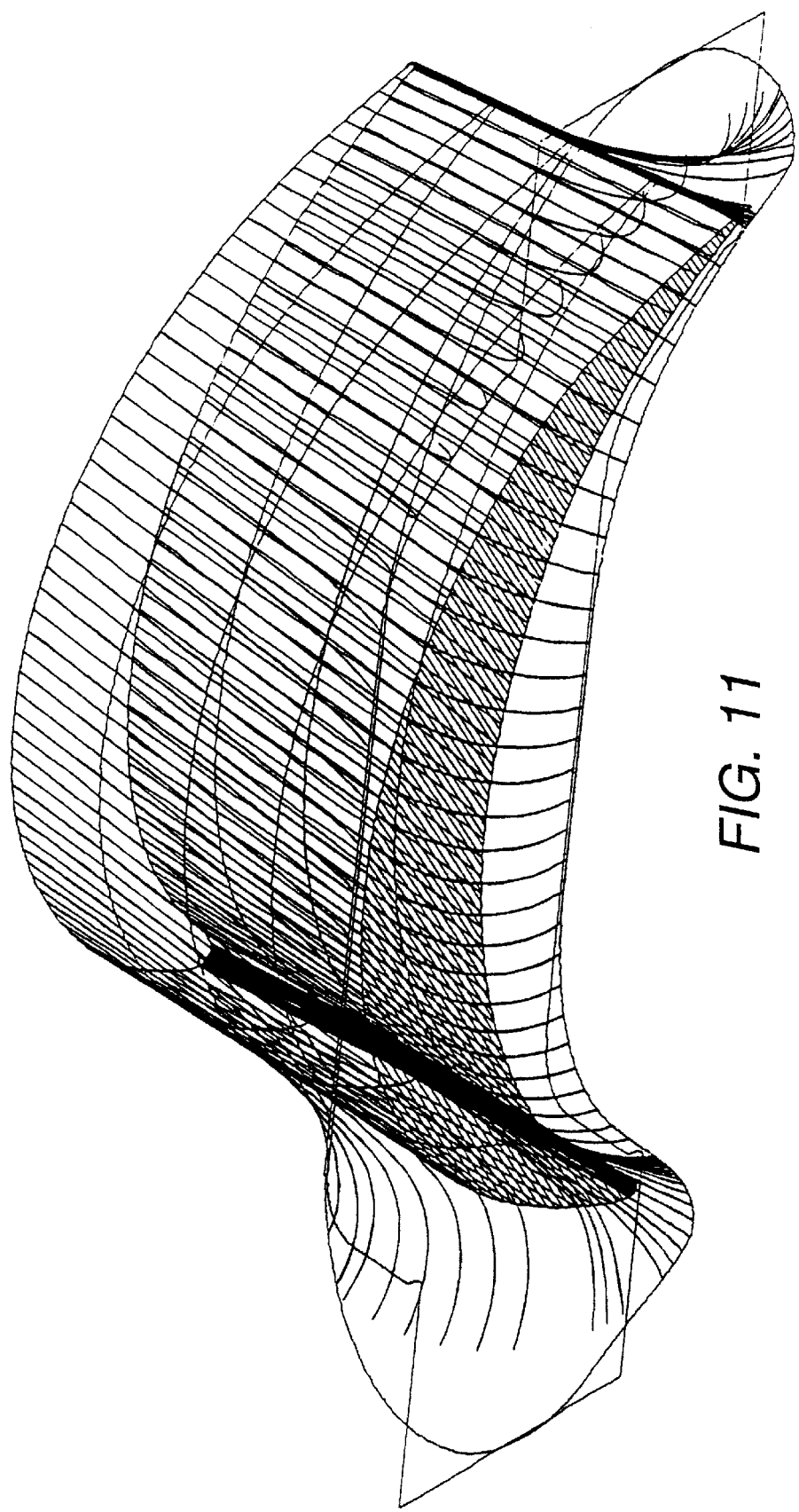
FIG. 11 shows a three-dimensional wire frame drawing showing the results of the final filleting calculation repeated around the entire airfoil according to this invention.

The calculation described with reference to FIG. 9 is repeated at each vertical curve in the airfoil section curves. FIG. 10 shows a three-dimension wire frame drawing showing results of the above calculation at a few positions on the pressure and suction sides of one of the airfoil section curves in the blade. FIG. 11 shows a three-dimensional wire frame drawing showing the results of the final filleting calculation repeated around the entire airfoil. The multi-segment fillet profile curves do not reach the platform footprint in some places because the limited search height does not allow this. At other times, the multi-segment fillet profile curves do not achieve tangency with the platform surface because there is not sufficient space within the platform footprint curve. Although tangency to the platform is desirable, the spatial constraints of the platform footprint may not always allow a tangent solution.

Figure 12:
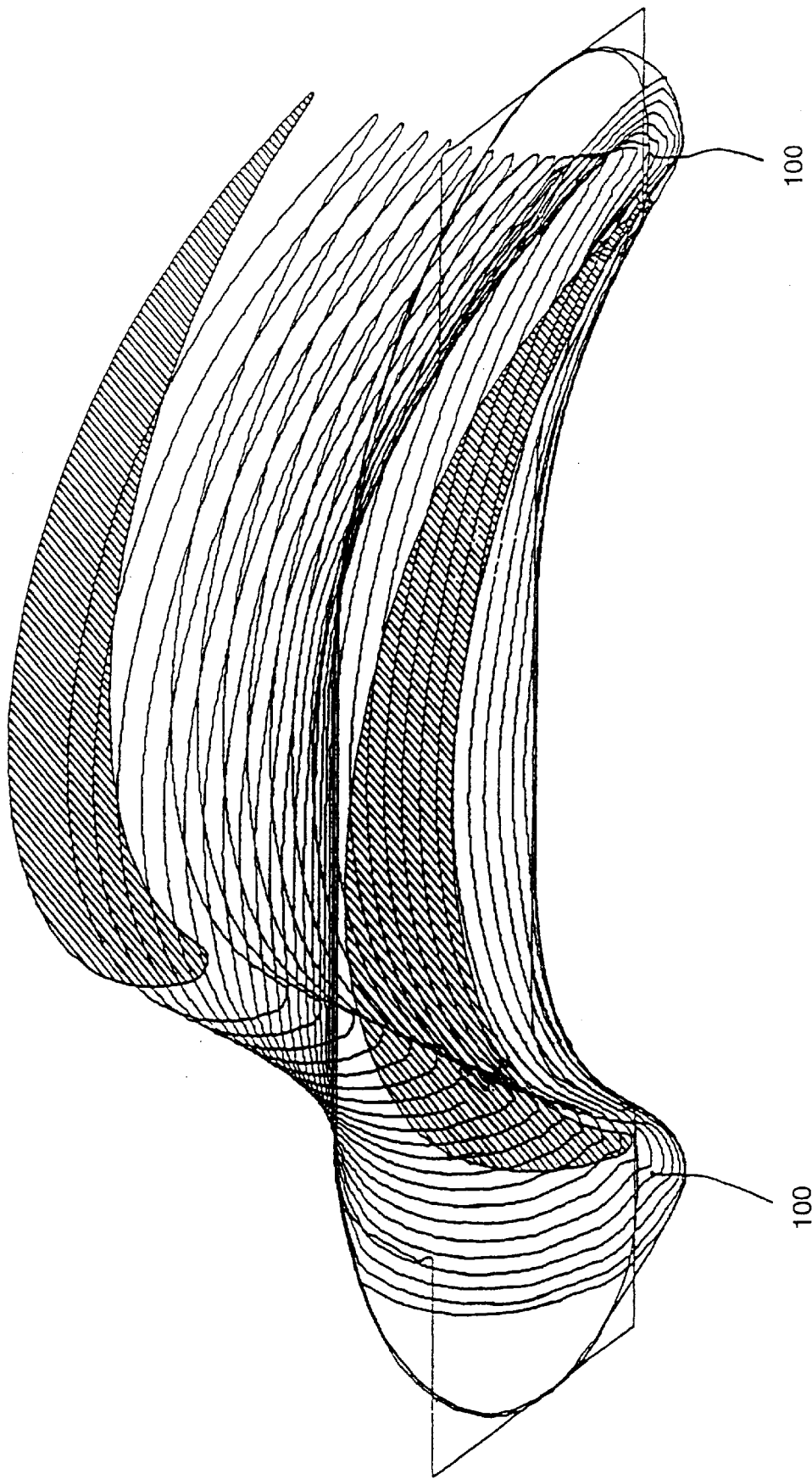
FIG. 12 shows a three dimensional wire frame drawing of fillet blending surface having small wrinkles in the vicinity of the leading and trailing edges.

While the result in FIG. 11 looks close, and indeed is close to the desired fillet blend surface, it is not adequate because of micro defects in smoothness. For instance, if the network of blended multi-segment fillet curves shown in FIG. 11 is sliced by surfaces parallel to the platform surface, then the resulting curve has small wrinkles in the vicinity of the leading and trailing edges. FIG. 12 shows a three dimensional wire frame drawing of fillet blending surface having small wrinkles 100 in the vicinity of the leading and trailing edges. These wrinkles are not acceptable from either a manufacturing or engineering viewpoint. Therefore, an alternate technique is required to complete the fillet blend around the leading and trailing edges of the airfoil.

Figure 13:
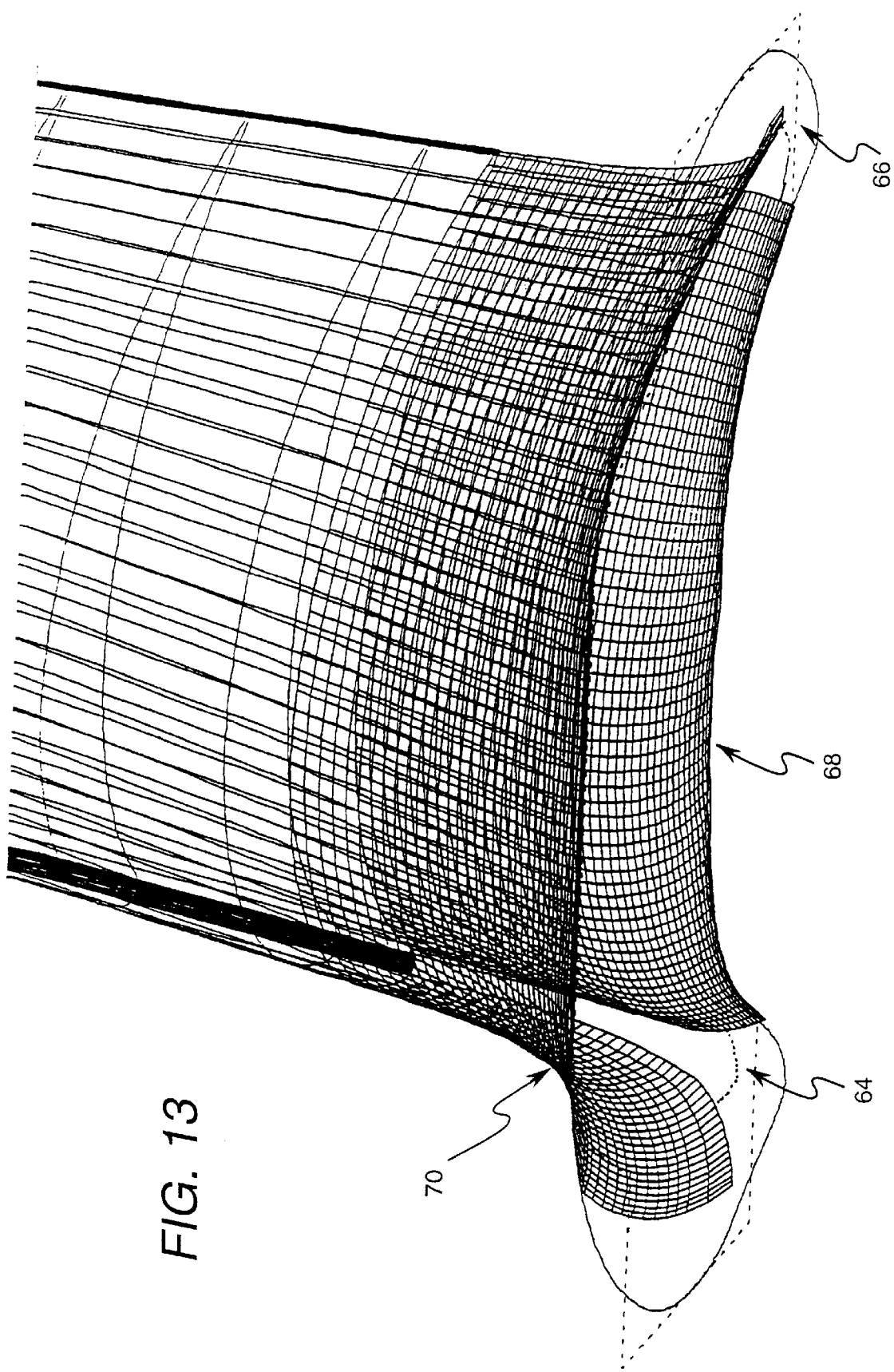
FIG. 13 shows a three-dimensional wire frame drawing of an airfoil with multi-segment fillet profile curves generated about the pressure side and the suction side, without any curves about the leading and trailing edges.

Referring back to FIG. 3, the next step is generating a plurality of blending curves about the leading and trailing edges at 58 in order to avoid the wrinkles. FIG. 13 shows a three-dimensional wire frame drawing of an airfoil with multi-segment fillet profile curves generated about the pressure side 68 and the suction side 70, without any curves about the leading edge 64 and the trailing edge 66. This invention slices or intersects these curves by a family of surfaces parallel to the platform surface and uses these intersections to make a surface mesh for the fillet blend surfaces on the suction and pressure sides of the airfoil. Assuming that these surface are smooth and stable, as shown in FIG. 13, this invention uses the surface to suggest end tangents across the leading and trailing edges.

Figure 14:
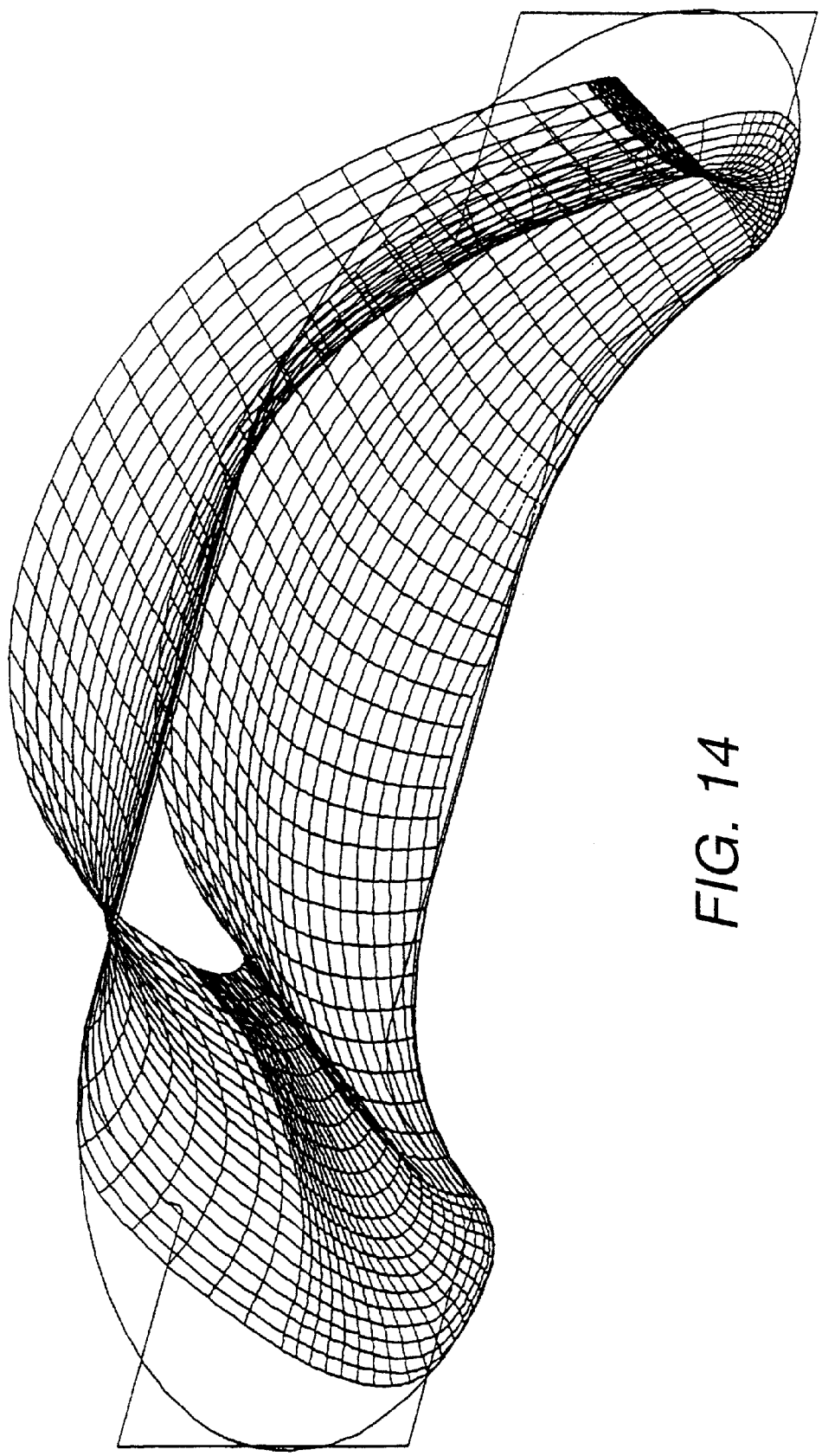
FIG. 14 shows a three-dimensional wire frame drawing of an airfoil with the multi segment fillet profile curves generated about the pressure side and the suction side and the blending curves about the leading and trailing edges according to this invention.

In this invention, a least tension curve algorithm or technique subject to end-points and tangents generates contours for a smooth blended fillet across the airfoil edge gaps. As these arcs are refitted with equally spaced points, a complete mesh of points is generated 5 across the leading and trailing edges. The completed mesh of points is shown in FIG. 14.

Figure 15:
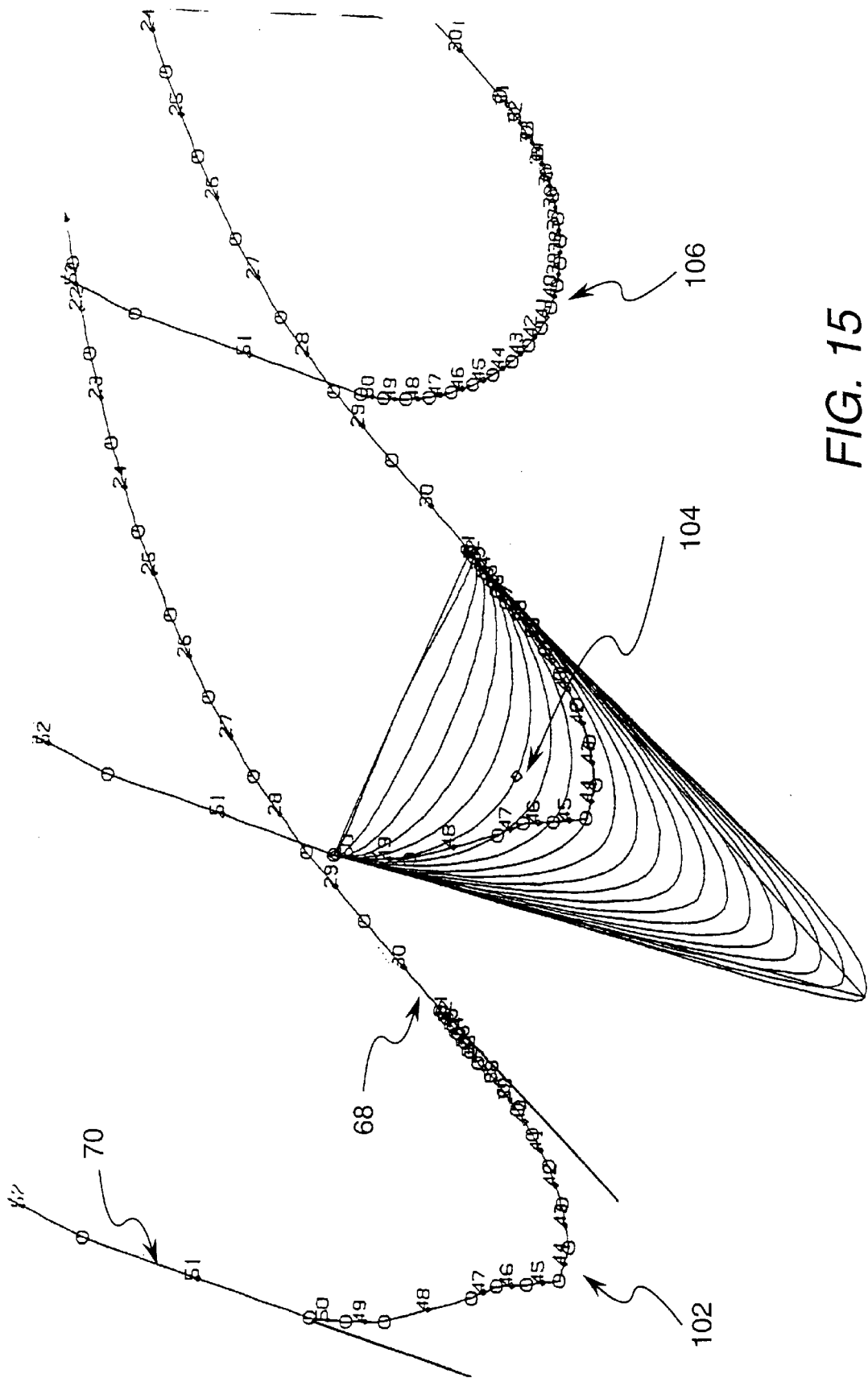
FIG. 15 shows a drawing explaining a least tension curve technique used in this invention.
Figure 16:
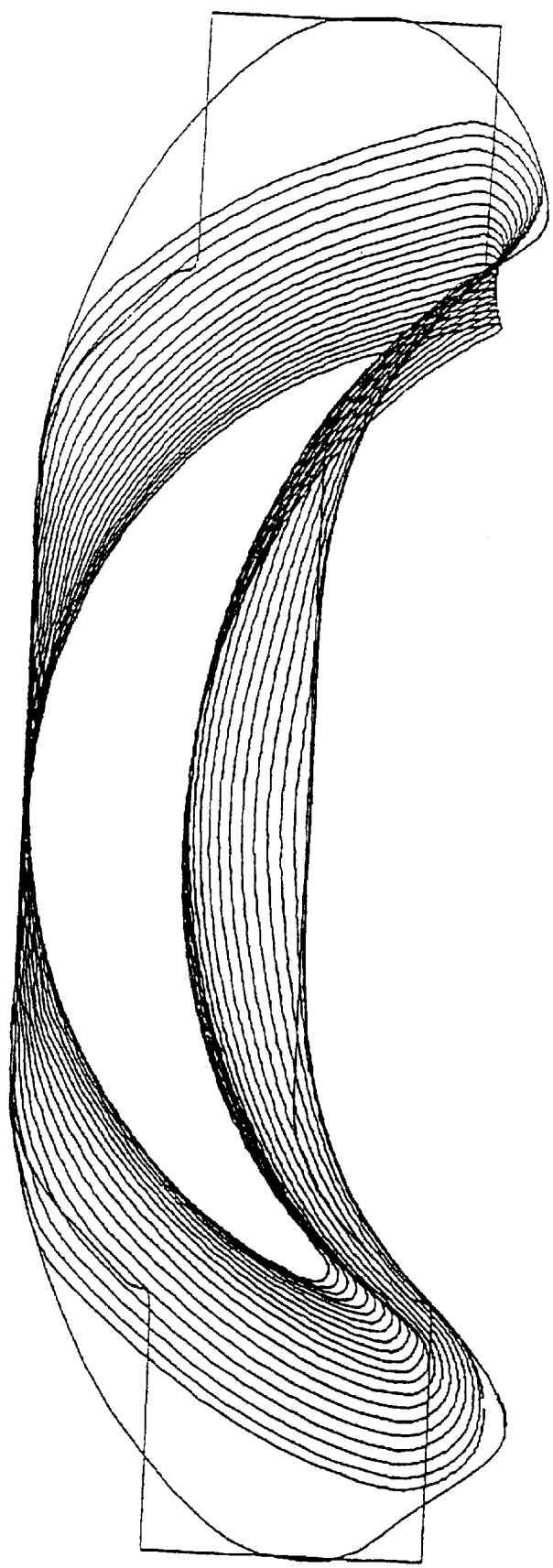
FIG. 16 shows a drawing of an airfoil with a complete set of contours that have been selected using the least tension curve technique.

The least tension curve, discussed in the previous paragraph, is restricted to two cubic segments joined smoothly at a mid-point. The least tension curve is found by using a standard repeat and search procedure of adjusting the middle point position of the segments and measuring the curve tension (which is the summation of the square of curvature over the arc length of the curve) and finding the mid point position which produces the least tension. In the event that the platform surface is not a plane, then these curves have to be defined within parallel offset surfaces to the platform surface. Three curves are shown in FIG. 15 to illustrate this concept. The curve on the left shows a single contour 102 through the leading edge as computed by profile positioning alone. The pressure and suction contours are smooth, but the transition contour across the leading edge is not smooth. The central contour in FIG. 15 shows a series of curves fitted across the leading edge and anchored by end-points and tangents of the adjacent pressure and suction side curves. Of these curves, the curve 104 with the least tension is marked with a diamond shape. The contour 106 on the right of FIG. 15 shows the final solution for this contour, where the minimum tension curve has been selected to fit the region through the leading edge and has been divided into a series of equally spaced points. The complete series of contours refined by this method is shown in FIG. 16.

Figure 17:
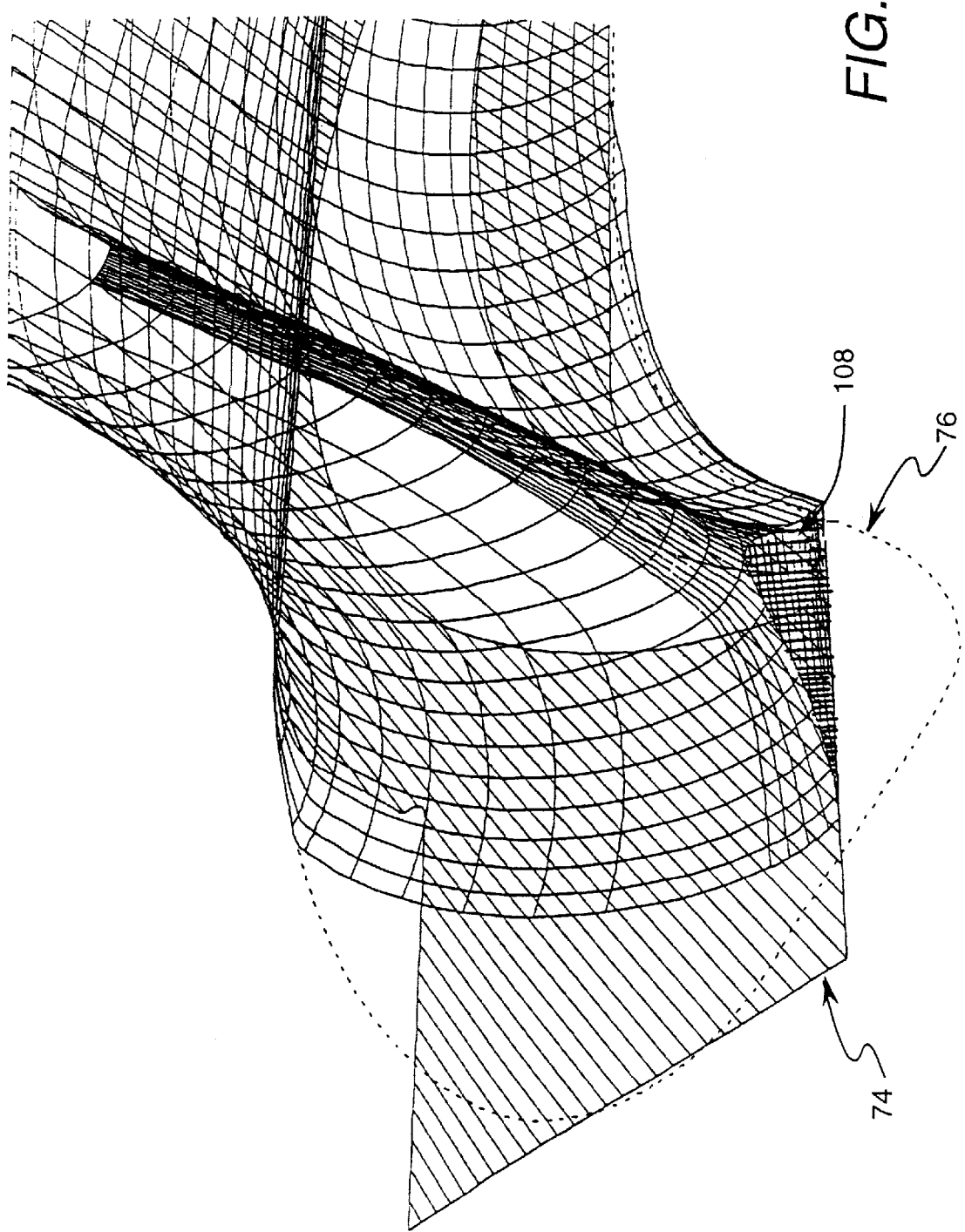
FIG. 17 shows a three-dimensional wire frame drawing of an airfoil having a leading edge truncated according to this invention

Referring back to FIG. 3, the next step in this invention is to render the complete blending fillet surfaces from the multi segment profile curves and the blending curves at 60. In particular, NURBS technology is used to create curvature continuous surfaces which are slope continuous at joints. Whenever the dovetail footprint extends beyond the physical dovetail, the portion of the fillet blend surface which overhangs the dovetail platform will be removed in the manufacturing process. FIG. 17 illustrates a truncated leading edge blend 108 as though it had been removed by a forming process. In this case, the small bell-shaped flat has been judged acceptable as a trade-off between strength and aerodynamics performance. After rendering the complete blending fillet surfaces, the computer sends the surfaces to the CAD or CAM system 12. An NC machining operation can then be used to manufacture the rendered fillet blend.

Figure 18:
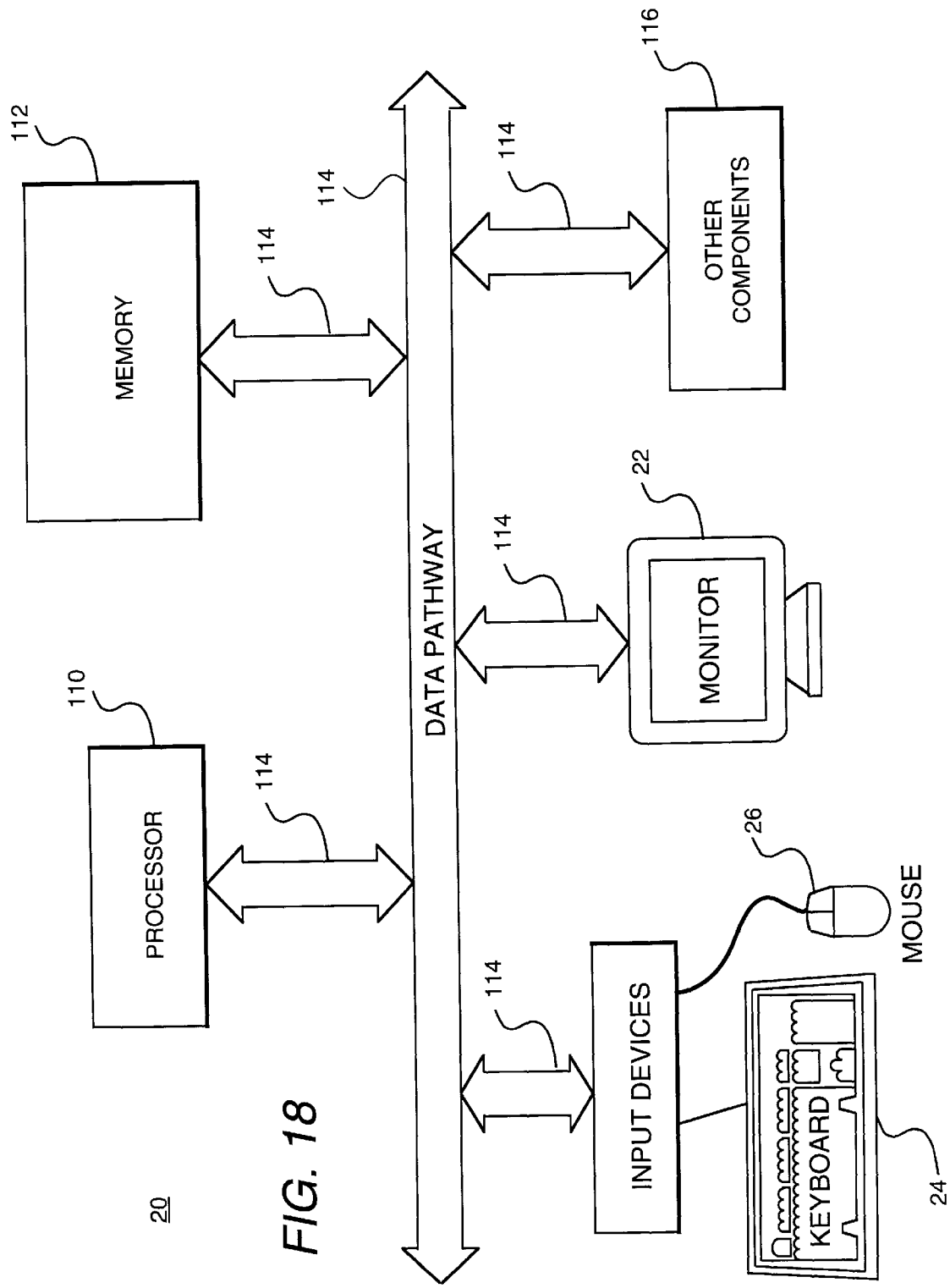

FIG. 18 shows a schematic of the general-purpose computer system 20 shown in FIG. 1 in which a part of the system for generating a smooth blending fillet surface operates on. The computer system 20 generally comprises the processor 110, memory 112, input/output devices such as the monitor 22, keyboard 24 and mouse 26, and data pathways (e.g., buses) 114 connecting the processor, memory and input/output devices. The processor 110 accepts instructions and data from the memory 112 and performs various calculations. The memory 112 generally includes the RAM, ROM and operating system, which executes on the processor 110. The operating system performs basic tasks that include recognizing input, sending output to output devices, keeping track of files and directories and controlling various peripheral devices. The computer system 20 may also comprise other components 116 such as a communication device and a mass storage device.

Figure 19:
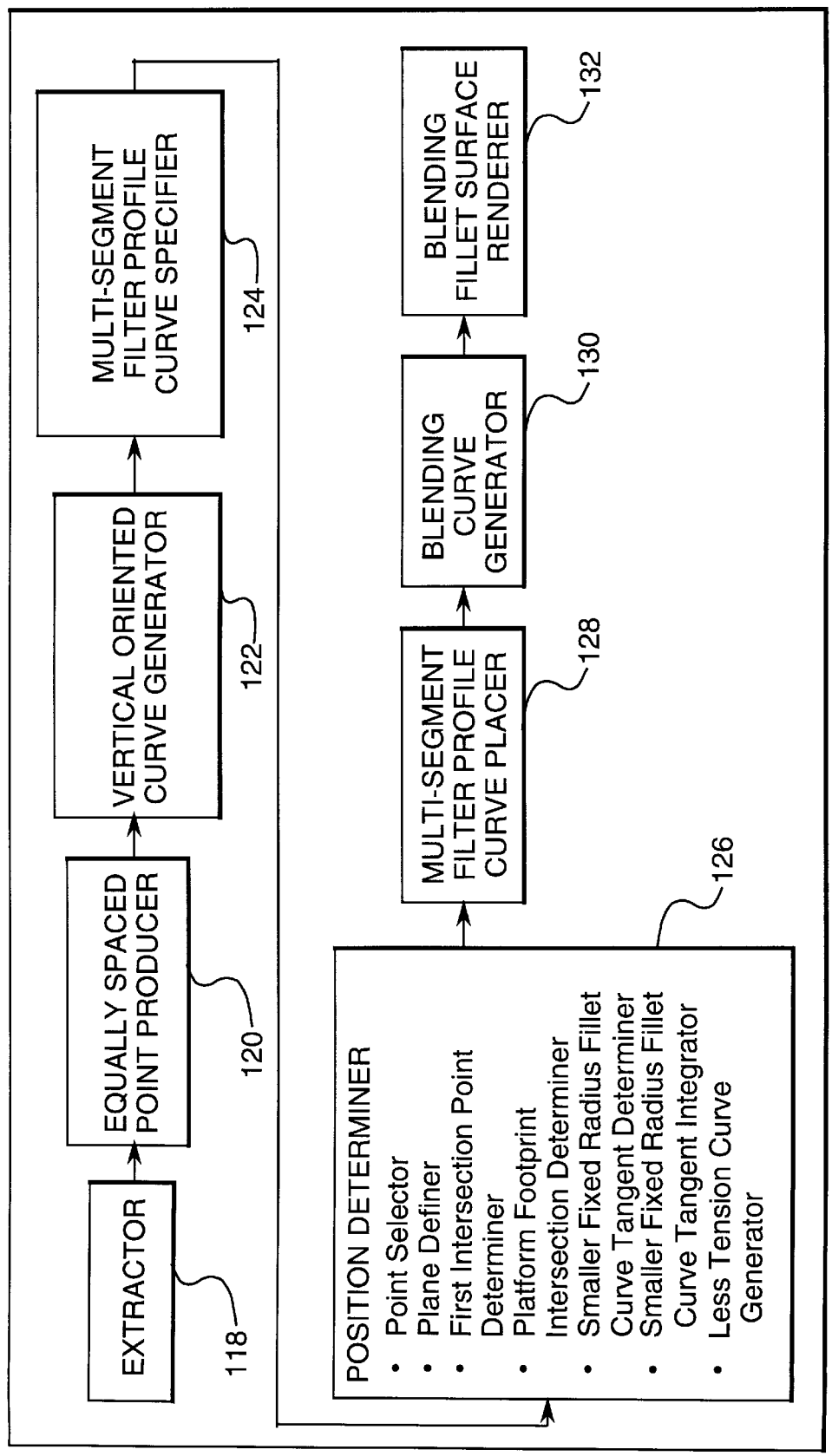
FIG. 19 shows a more detailed view of the functional elements of the system shown in FIG. 18 and a process flow of how the elements generate the smooth blending fillet surface.

FIG. 19 shows a more detailed view of the functional elements of the system 20 shown in FIG. 18 and a process flow of how the elements generate the smooth blending fillet surface. In particular, FIG. 19 shows the functions performed by the processor 110 and the process flow of the functions to generate the smooth blending fillet surface. An extractor 118 extracts the plurality of section curves 62, the platform surface 72, and the platform footprint 76 from memory 112. An equally spaced point producer 120 produces the plurality of equally spaced points 78 throughout each of the plurality of section curves 62. A vertically oriented curve generator 122 generates the plurality of vertically oriented curves 84 crossing through each of the plurality section curves 62. A multi-segment fillet profile curve specifier 124 specifies the first multi-segment fillet profile curve 88 and the second multi-segment fillet profile curve 86.

A position determiner 126 determines a position for placing both the first and the second multi-segment fillet profile curves about each of the plurality of vertically oriented curves 84. The position determiner 126 comprises a point selector that selects a point SP at a specified height along one of the plurality of vertically oriented curves 84. A plane definer defines the plane for positioning both the first and the second multi-segment fillet profile curves according to the selected point. A first intersection point determiner determines a first intersection point between both the first and the second multi-segment fillet profile curves and the platform surface 72 in the defined plane. A platform footprint intersection determiner determines whether the first intersection point is contained within the platform footprint 76 for the defined plane. The position determiner 126 also comprises a smaller fixed radius fillet curve tangent determiner that determines the smaller fixed radius fillet curve 98 tangent to both the first and second multi-segment fillet curves and the platform surface 72 for the defined plane. Also, a smaller fixed radius fillet curve tangent integrator integrates the smaller fixed radius fillet curve 98 into both the first and second multi-segment fillet curves. In addition, the position determiner 126 comprises a least tension curve generator that uses the least tension curve technique to generate the plurality of blending curves.

The processor 110 also comprises a multi-segment fillet profile curve placer function 128 that places the first and the second multi-segment fillet profile curves about the pressure sides and the suction sides of each of the plurality of section curves 62. A blending curve generator 130 generates the plurality of blending curves about the leading edges and the trailing edges of each of the plurality of section curves 62. A blending fillet surface renderer 132 renders the blending fillet surface 44 from the first and the second multi-segment fillet profile curves and the plurality of blending curves.

It is therefore apparent that there has been provided in accordance with the present invention, a system and method for generating a blending fillet surface that fully satisfy the aims and advantages and objectives hereinbefore set forth. The invention has been described with reference to several embodiments, however, it will be appreciated that variations and modifications can be effected by a person of ordinary skill in the art without departing from the scope of the invention.

What is claimed is:

1. A system for generating a blending fillet surface between a platform and airfoil mounted thereto, comprising:
   a memory for storing a user-specified airfoil shape for the airfoil comprising a plurality of section curves substantially parallel to each other and each having a leading edge, a trailing edge, a pressure side, and a suction side, a platform surface, and a platform footprint for the platform;
   a processor coupled to the memory, for generating the blending fillet surface, comprising:
      means for extracting the plurality of section curves, the platform surface, and the platform footprint from the memory;
      means for generating a plurality of vertically oriented curves crossing through each of the plurality of extracted section curves;
      means for specifying a first multi-segment fillet profile curve for blending the pressure sides of the plurality of extracted section curves to the platform and a second multi-segment fillet profile curve for blending the suction sides of the plurality of section curves to the platform;
      means for determining a position for placing both the first and the second multi-segment fillet profile curves about each of the plurality of generated vertically oriented curves;
      means for placing the specified first and the second multi-segment fillet profile curves about the pressure sides and the suction sides of each of the plurality of extracted section curves;
      means for generating a plurality of blending curves about the leading edges and the trailing edges of each of the plurality of extracted section curves; and
      means for rendering the blending fillet surface from the first and the second multi-segment fillet profile curves and the plurality of blending curves.

2. The system according to claim 1, wherein the processor further comprises means for producing a plurality of equally spaced points throughout each of the plurality of extracted section curves.

3. The system according to claim 2, wherein the plurality of vertically oriented curves cross through the plurality of equally spaced points.

4. The system according to claim 1, wherein said determining means comprises:
   means for selecting a point at a specified height along one of the plurality of generated vertically oriented curves;
   means for defining a plane for positioning both the specified first and the second multi-segment fillet profile curves according to the selected point;
   means for determining a first intersection point between both the specified first and the second multi-segment fillet profile curves and the platform surface in the defined plane; and
   means for determining whether the first intersection point is contained within the platform footprint for the defined plane.

5. The system according to claim 4, further comprising:
   means for finding the next intersection point between both the specified first and the second multi-segment fillet profile curves and the platform surface in the defined plane that is contained within the platform footprint if the first intersection point is outside the platform footprint.

6. The system according to claim 4, further comprising:
   means for determining a smaller fixed radius fillet curve tangent to both the specified first and second multi-segment fillet curves and the platform surface for the defined plane; and
   means for integrating the determined smaller fixed radius fillet curve into both the specified first and second multi-segment fillet curves.

7. The system according to claim 1, wherein the generating means comprises:
   means for using a least tension curve technique to generate the plurality of blending curves.

8. The system according to claim 1, wherein each of the plurality of blending curves define end point tangents across the leading edges and the trailing edges of each of the plurality of section curves.

9. The system according to claim 1, further comprising a CAD/CAM system, coupled to the memory and processor, for storing the rendered blending fillet surface.

10. The system according to claim 1, further comprising a NC machining device, coupled to the memory and processor, for machining the rendered blending fillet surface.

11. A computer-implemented method for generating a blending fillet surface between a platform and an airfoil mounted thereto, comprising:
   specifying an airfoil shape for the airfoil shape for the airfoil comprising a plurality of section curves substantially parallel to each other and each having a leading edge, a trailing edge, a pressure side, and a suction side, a platform surface, and a platform footprint for the platform;
   generating a plurality of vertically oriented curves crossing through each of the plurality section curves;
   specifying a first multi-segment fillet profile curve for blending the pressure sides of the plurality of section curves to the platform and a second multi-segment fillet profile curve for blending the suction sides of the plurality of section curves to the platform;
   determining a position for placing both the first and the second multi-segment fillet profile curves about each of the plurality of vertically oriented curves;
   placing the first and the second multi-segment fillet profile curves about the pressure sides and the suction sides of each of the plurality of section curves;
   generating a plurality of blending curves about the leading edges and the trailing edges of each of the plurality of section curves; and
   rendering the blending fillet surface from the first and the second multi-segment fillet profile curves and the plurality of blending curves.

12. The method according to claim 11, further comprising producing a plurality of equally spaced points throughout each of the plurality of section curves.

13. The method according to claim 12, wherein the plurality of vertically oriented curves cross through the plurality of equally spaced points.

14. The method according to claim 11, wherein said determining a position for placing both the first and the second multi-segment fillet profile curves about each of the plurality of vertically oriented curves comprises:
   selecting a point at a specified height along one of the plurality of vertically oriented curves;

defining a plane for positioning both the first and the second multi-segment fillet profile curves according to the selected point;

determining a first intersection point between both the first and the second multi-segment fillet profile curves and the platform surface in the defined plane; and determining whether the first intersection point is contained within the platform footprint for the defined plane.

15. The method according to claim 14, further comprising:

finding the next intersection point between both the first and the second multi-segment fillet profile curves and the platform surface in the defined plane that is contained within the platform footprint if the first intersection point is outside the platform footprint.

16. The method according to claim 14, further comprising:

determining a smaller fixed radius fillet curve tangent to both the first and second multi-segment fillet curves and the platform surface for the defined plane; and integrating the smaller fixed radius fillet curve into both the first and second multi-segment fillet curves.

17. The method according to claim 11, wherein the generating of a plurality of blending curves about the leading edges and the trailing edges of each of the plurality of section curves comprises:

using a least tension curve technique to generate the plurality of blending curves.

18. The method according to claim 11, wherein each of the plurality of blending curves define end point tangents across the leading edges and the trailing edges of each of the plurality of section curves.

19. The method according to claim 11, further comprising storing the rendered blending fillet surface in a CAD/CAM system.

20. The method according to claim 11, further comprising using the rendered blending fillet surface in a manufacturing process.

21. An article of manufacture, comprising:

a computer usable medium containing computer readable program code means embodied therein for generating a blending fillet surface between a platform and an airfoil mounted thereto, the computer readable program code means in the article of manufacture comprising:

computer readable program code means for specifying an airfoil shape for the airfoil comprising a plurality of section curves substantially parallel to each other and each having a leading edge, a trailing edge, a pressure side, and a suction side, a platform surface, and a platform footprint for the platform;

computer readable program code means for generating a plurality of vertically oriented curves crossing through each of the plurality section curves;

computer readable program code means for specifying a first multi-segment fillet profile curve for blending the pressure sides of the plurality of section curves to the platform and a second multi-segment fillet profile curve for blending the suction sides of the plurality of section curves to the platform;

computer readable program code means for determining a position for placing both the first and the second multi-segment fillet profile curves about each of the plurality of vertically oriented curves;

computer readable program code means for placing the first and the second multi-segment fillet profile curves about the pressure sides and the suction sides of each of the plurality of section curves;

computer readable program code means for generating a plurality of blending curves about the leading edges and the trailing edges of each of the plurality of section curves; and computer readable program code means for rendering the blending fillet surface from the first and the second multi-segment fillet profile curves and the plurality of blending curves.

22. The article of manufacture according to claim 21, further comprising computer readable program code means for producing a plurality of equally spaced points throughout each of the plurality of section curves.

23. The article of manufacture according to claim 22, wherein the plurality of vertically oriented curves cross through the plurality of equally spaced points.

24. The article of manufacture according to claim 21, wherein said computer readable program code means for determining a position for placing both the first and the second multi-segment fillet profile curves about each of the plurality of vertically oriented curves comprises:

computer readable program code means for selecting a point at a specified height along one of the plurality of vertically oriented curves;

computer readable program code means for defining a plane for positioning both the first and the second multi-segment fillet profile curves according to the selected point;

computer readable program code means for determining a first intersection point between both the first and the second multi-segment fillet profile curves and the platform surface in the defined plane; and computer readable program code means for determining whether the first intersection point is contained within the platform footprint for the defined plane.

25. The article of manufacture according to claim 24, further comprising:

computer readable program code means for finding the next intersection point between both the first and the second multi-segment fillet profile curves and the platform surface in the defined plane that is contained within the platform footprint if the first intersection point is outside the platform footprint.

26. The article of manufacture according to claim 24, further comprising:

computer readable program code means for determining a smaller fixed radius fillet curve tangent to both the first and second multi-segment fillet curves and the platform surface for the defined plane; and computer readable program code means for integrating the smaller fixed radius fillet curve into both the first and second multi-segment fillet curves.

27. The article of manufacture according to claim 21, wherein the computer readable program code means for generating a plurality of blending curves about the leading edges and the trailing edges of each of the plurality of section curves comprises:

computer readable program code means for using a least tension curve technique to generate the plurality of blending curves.

28. The article of manufacture according to claim 21, wherein each of the plurality of blending curves define end point tangents across the leading edges and the trailing edges of each of the plurality of section curves.

* * * * *